United States Patent
Higuchi et al.

(10) Patent No.: US 10,644,348 B2
(45) Date of Patent: May 5, 2020

(54) CRYSTALLINE SOLID ELECTROLYTE AND PRODUCTION METHOD THEREFOR

(71) Applicant: Mitsui Mining & Smelting Co., Ltd., Tokyo (JP)

(72) Inventors: Tsutomu Higuchi, Saitama (JP); Norihiko Miyashita, Saitama (JP); Kenji Matsuzaki, Saitama (JP); Takahiro Ito, Saitama (JP); Kenji Tomonari, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 1076 days.

(21) Appl. No.: 14/902,021

(22) PCT Filed: Feb. 28, 2014

(86) PCT No.: PCT/JP2014/055136
§ 371 (c)(1),
(2) Date: Dec. 30, 2015

(87) PCT Pub. No.: WO2015/001818
PCT Pub. Date: Jan. 8, 2015

(65) Prior Publication Data
US 2016/0164136 A1    Jun. 9, 2016

(30) Foreign Application Priority Data
Jul. 4, 2013   (JP) ................. 2013-140678

(51) Int. Cl.
*H01M 10/00*   (2006.01)
*H01M 10/0562*   (2010.01)
(Continued)

(52) U.S. Cl.
CPC ......... *H01M 10/0562* (2013.01); *C01B 17/20* (2013.01); *C01B 17/22* (2013.01);
(Continued)

(58) Field of Classification Search
CPC .......... H01M 10/052; H01M 10/0562; H01M 10/0525; H01M 2300/008;
(Continued)

(56) References Cited

U.S. PATENT DOCUMENTS 9,263,763 B2   2/2016 Kawamoto
2010/0047691 A1   2/2010 Kawakami
(Continued)

FOREIGN PATENT DOCUMENTS

CN   101569035 A   10/2009
JP   6-115911   4/1994
(Continued)

OTHER PUBLICATIONS

Korean Office Action dated Aug. 16, 2016 issued in the corresponding Korean patent application No. 10-2015-7028151.
(Continued)

*Primary Examiner* — Nicholas P D'Aniello
(74) *Attorney, Agent, or Firm* — Rankin, Hill & Clark LLP

(57) ABSTRACT

Provided is a novel crystalline solid electrolyte which can be used as a dispersion medium when slurrying polar solvents such as NMP, acetone, and DMF, and for which a decrease in conductivity when the crystalline solid electrolyte is immersed in said solvents can be suppressed. Proposed is a crystalline solid electrolyte represented by Compositional Formula: $Li_xSi_yP_zS_qHa_w$ (here, Ha includes one or two or more of Br, Cl, I, and F, and $2.4<(x-y)/(y+z)<3.3$), in which the content of S is 55 to 73% by mass, the content of Si is 2 to 11% by mass, and the content of a Ha element is 0.02% by mass or more.

5 Claims, 1 Drawing Sheet

(51) Int. Cl.
  H01B 1/10     (2006.01)
  H01M 10/052   (2010.01)
  C01B 17/22    (2006.01)
  C01B 17/20    (2006.01)
  H01M 10/0525  (2010.01)

(52) U.S. Cl.
  CPC ............ H01B 1/10 (2013.01); H01M 10/052 (2013.01); H01M 10/0525 (2013.01); H01M 2220/20 (2013.01); H01M 2220/30 (2013.01); H01M 2300/008 (2013.01); H01M 2300/0068 (2013.01); *Y02E 60/122* (2013.01); *Y02P 70/54* (2015.11); *Y02T 10/7011* (2013.01)

(58) Field of Classification Search
  CPC ......... H01M 2220/20; H01M 2220/30; H01M 2300/0068; C01B 17/20; C01B 17/22; H01B 1/10; Y02E 60/122; Y02P 70/54; Y02T 10/7011
  USPC ........................................................ 429/323
  See application file for complete search history.

(56) References Cited

U.S. PATENT DOCUMENTS

| | | | |
|---|---|---|---|
| 2013/0040208 A1 | 2/2013 | Otomo | |
| 2014/0302382 A1* | 10/2014 | Kambara | ............... C03C 10/16 429/162 |
| 2014/0363745 A1 | 12/2014 | Kawamoto | |

FOREIGN PATENT DOCUMENTS

| | | | | |
|---|---|---|---|---|
| JP | 2002109955 A2 | 4/2002 | | |
| JP | 2010212058 A2 | 9/2010 | | |
| JP | 2012212652 A2 | 11/2012 | | |
| JP | 201316423 | 1/2013 | | |
| WO | 2011118801 A1 | 9/2011 | | |
| WO | WO-2011118801 A1 * | 9/2011 | ............ | C01B 17/20 |
| WO | 2012128374 A1 | 9/2012 | | |
| WO | 2013005085 A1 | 1/2013 | | |
| WO | 2013069243 A1 | 5/2013 | | |
| WO | 2013094757 A1 | 6/2013 | | |

OTHER PUBLICATIONS

Chinese Office Action dated May 31, 2016 issued in the corresponding Chinese patent application No. 201480026450.6.
Extended European Search Report dated Oct. 28, 2016 issued in the corresponding European patent application No. 14820104.9.
Kennedy J H, and Zhang Z, "Improved stability for the SiS2—P2S5—Li2S—LiI Glass system," Solid State Ionics, Sep. 1998, vol. 28/30 No. Pt.1, pp. 726-728.; Cited in Japanese Notice of Allowance.
Japanese Notice of Allowance dated Oct. 4, 2016 issued in the corresponding Japanese patent application No. 2015-525065.
International Search Report dated Apr. 22, 2014 filed in PCT/JP2014/055136.

\* cited by examiner

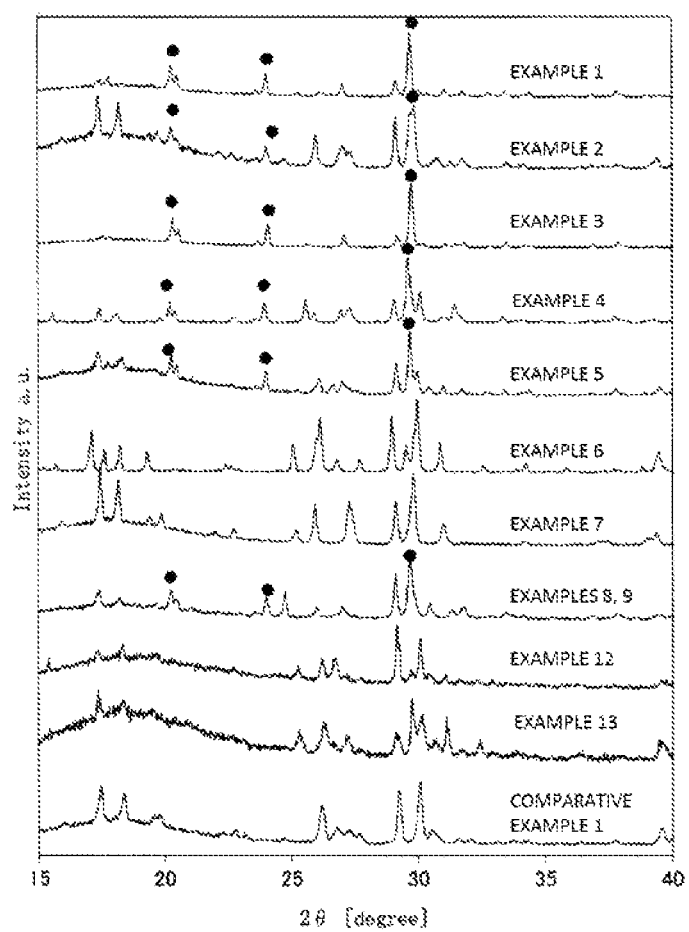

CRYSTALLINE SOLID ELECTROLYTE AND PRODUCTION METHOD THEREFOR

TECHNICAL FIELD

The present invention relates to a crystalline solid electrolyte capable of being suitably used as a solid electrolyte for a lithium secondary battery, and a method for producing the same.

BACKGROUND ART

A lithium secondary battery is a secondary battery having a structure, in which, at the time of charging, lithium begins to dissolve as ions from a positive electrode and moves to a negative electrode to be stored therein, while, conversely, at the time of discharging, the lithium ions return from the negative electrode to the positive electrode. Since the lithium secondary battery has high energy density and a long life cycle, it is widely used as a power supply for home appliances such as a video camera, portable electronic equipment such as a notebook computer and a portable telephone, and electrically-drive tools such as a power tool. Recently, the lithium secondary battery is also applied to a large-sized battery that is mounted in an electric vehicle (EV), a hybrid electric vehicle (HEV), or the like.

This kind of a lithium secondary battery is constituted of a positive electrode, a negative electrode, and an ion conducting layer inserted between both of the electrodes. As the ion conducting layer, a separator constituted of a porous film, such as polyethylene and polypropylene, which is filled with a non-aqueous electrolytic solution, is generally used. However, since such an organic electrolytic solution using a flammable organic solvent as a solvent is used as an electrolyte, it is required to improve the structure and material for preventing volatilization or leakage, and also, it is required to install a safety device for suppressing an increase in temperature at the time of a short circuit and to improve the structure and material for preventing a short circuit.

In contrast, an all-solid lithium secondary battery that is constituted by solidifying the whole battery using a solid electrolyte does not use a flammable organic solvent, and thus, it is possible to attempt the simplification of a safety device. In addition, the battery can be made excellent in the production cost or productivity. Furthermore, it is possible to attempt high voltage by laminating it in a cell in series. Furthermore, for this kind of a solid electrolyte, a Li ion only moves, and thus, there are no side reactions by the movement of anion. Therefore, it is expected that it leads to improve safety or durability.

As this kind of a solid electrolyte, there is disclosed a sulfide-based solid electrolyte including $Li_7PS_6$, $Li_4P_2S_6$, $Li_3PS_4$, or the like, in a crystal phase, as a solid electrolyte exhibiting high lithium ion conductivity (For example, see Patent Document 1).

Among them, the crystalline solid electrolyte including $Li_3PS_4$ in a crystal phase is chemically stable, and also, has high conductivity. Therefore, it is a material that is particularly brought to attention. In addition, it is considered that an amorphous solid electrolyte is decomposed when it is immersed in an organic solvent, and thus, a solid electrolyte having high crystallinity (refers to as "crystalline solid electrolyte") is practically preferable.

As for such a crystalline solid electrolyte including $Li_3PS_4$ in a crystal phase, for example, Patent Document 2 discloses a sulfide solid electrolyte, which has good ionic conductivity, the composition of $Li_{(4-x)}P_xGe_{(1-x)}S_4$ (x satisfies 0<x<1), the peak at the position of $2\theta=29.58°±0.50°$ for X-ray diffraction measurement using a CuKα line, and less than 0.50 of the ratio $(I_B/I_A)$ of the peak diffraction intensity $I_B$ of $2\theta=27.33°±0.50°$ to the peak diffraction intensity $I_A$ of $2\theta=29.58°±0.50°$.

By the way, in the case of forming a solid electrolyte layer using this kind of a solid electrolyte, it is performed that the slurry obtained by mixing, grinding, and then, slurrying a dispersion medium composed of a solid electrolyte and an organic solvent is applied on a substrate to form a coating film for forming a solid electrolyte layer, and the film is dried to form a solid electrolyte layer.

However, the sulfide solid electrolyte including sulfur has very high reactivity, and thus, the dispersion medium, which can be used at the time of preparing slurry, is limited to a non-polar solvent such as toluene or heptane.

In this regard, Patent Document 3 discloses that it is also possible to use a dispersion medium composed of at least one of tertiary amine; ether; thiol; ester having a functional group having 3 or more of carbon atoms, which is bound to the carbon atom of an ester group, and a functional group having 4 or more of carbon atoms, which is bound to the oxygen atom of an ester group; and ester having a benzene ring which is bound to the carbon atom of an ester group, as a solvent (dispersion medium) when slurrying the sulfide solid electrolyte, as a solvent other than a non-polar solvent.

CITATION LIST

Patent Document

Patent Document 1: JP 2002-109955 A
Patent Document 2: WO 2011/118801
Patent Document 3: JP 2012-212652 A

DISCLOSURE OF THE INVENTION

Problem to be Solved by the Invention

As described above, the sulfide-based solid electrolyte has high reactivity. Therefore, the solvent, which can be used as a dispersion medium when slurrying the sulfide solid electrolyte, is limited to non-polar solvents or solvents having low polarity, for example, toluene, heptane, triethylamine, tertiary amine, ether, thiol, and the like, even though there are included the solvents disclosed in Patent Document 3 described above.

In addition, it is found from the research by the present inventors that since the sulfide-based solid electrolyte has high reactivity with a solvent, the conductivity is decreased when it is dissolved in a solvent to form a paste.

Therefore, the invention provides a novel crystalline solid electrolyte, which can be used as a dispersion medium when slurrying polar solvents such as N-methyl-2-pyrrolidone (NMP), acetone, and N,N-dimethylformamide (DMF) and for which a decrease in conductivity when the crystalline solid electrolyte is immersed in these solvents can be suppressed, and a method for producing the same.

Means for Solving Problem

The invention proposes a crystalline solid electrolyte being represented by Compositional Formula: $Li_xSi_yP_zS_a$-$Ha_w$ (here, Ha includes one or two or more of Br, Cl, I, and F, and 2.4<(x−y)/(y+z)<3.3), in which the content of S is 55 to 73% by mass, the content of Si is 2 to 11% by mass, and the content of a Ha element is 0.02% by mass or more.

Effect of the Invention

Since the crystalline solid electrolyte proposed by the invention has high chemical stability, the slurrying thereof can be performed using a polar solvent such as NMP, acetone, or DMF, and also, the conductivity thereof can be maintained in a high level even when the crystalline solid electrolyte is immersed in these solvents.

BRIEF DESCRIPTION OF DRAWINGS

FIG. 1 is an X-ray diffraction chart of the samples obtained from Examples 1 to 13 and Comparative Example 1.

MODE(S) FOR CARRYING OUT THE INVENTION

Next, the invention will be described based on embodiments. However, the invention is not limited to the embodiments described below.

(Present Solid Electrolyte)

The crystalline solid electrolyte according to the present embodiment (refers to as the "present solid electrolyte") is represented by Compositional Formula (1): $Li_xSi_yP_zS_aHa_w$ (here, Ha includes one or two or more of Br, Cl, I, and F, and $2.4<(x-y)/(y+z)<3.3$, in which the content of S is 55 to 73% by mass, the content of Si is 2 to 11% by mass, and the content of a Ha element is 0.02% by mass or more.

A solid electrolyte is not an electron, but is a solid that allows ions such as $Li^+$ to pass through. Particularly, the present solid electrolyte has high chemical stability, and thus, the slurrying thereof can be performed using a polar solvent such as NMP, acetone, or DMF. Furthermore, the conductivity thereof after the present solid electrolyte is immersed in these solvents can be maintained in a high level. In detail, the conductivity (room temperature) after the present solid electrolyte is immersed in N-methyl-2-pyrrolidone (NMP) can be $1\times10^{-5}$ S·cm$^{-1}$ or more.

In addition, as described below, the present solid electrolyte can be produced by mixing it with a means such as a general ball mill, without performing a mechanical milling process, and thus, the present solid electrolyte is practical in terms of productivity and economic efficiency.

It is considered that $2.4<(x-y)/(y+z)<3.3$ in the above Compositional Formula (1) means the same as in a basic structure of $PS_4$ type tetrahedron molecular structure and there are the same physical properties. In other words, when satisfying $Li_{3+\alpha}Si_\alpha P_{1-\alpha}S_4$, $x-y=3.0$, $y+z=1.0$, and $(x-y)/(y+z)=3.0$, and thus, the value of $(x-y)/(y+z)$ is within the range of 2.6 to 3.1 as the center of 3.0. Therefore, it is considered that the structure is based on $Li_{3+\alpha}Si_\alpha P_{1-\alpha}S_4$, and thus, it is possible to obtain the same effect as $Li_{3+\alpha}Si_\alpha P_{1-\alpha}S_4$.

From such a viewpoint, "$(x-y)/(y+z)$" is preferably 2.5 to 3.2 and among them, more preferably 2.4 to 3.1.

Furthermore, the content (% by mass) of Li is preferably 11.5 to 14.9% by mass, and among them, 11.5% by mass or more and 13.8% by mass or less and among them, more preferably 11.5% by mass or more and 13.6% by mass or less.

In addition, the content (% by mass) of P is preferably 4.6 to 14.0% by mass, and among them, 4.8% by mass or more and 13.7% by mass or less and among them, more preferably 5.0% by mass or more and 13.5% by mass or less.

For the above Compositional Formula (1), the content of Si is preferably 2 to 11% by mass. Even when the content of Si is less than 2% by mass and also exceeds 11% by mass, the solid electrolyte exhibits the crystal structure having low ionic conductivity, and thus, the tendency of decreasing initial conductivity is recognized. Even if the solid electrolyte is stable in a polar solvent, when the initial conductivity is low, there is a problem in the use, which is unfavorable.

From such a viewpoint, the content of Si is preferably 2 to 11% by mass, and among them, 3% by mass or more and 9% by mass or less and among them, more preferably 4.5% by mass or more and 8.0% by mass or less.

For the above Compositional Formula (1), the content of a Ha element is preferably 0.02% by mass or more. When the content of a Ha element is less than 0.02% by mass, the reactivity with a polar solvent becomes strong, and thus, the chemical stability becomes low. Therefore, the conductivity after the solid electrolyte is immersed in a solvent (for example, NMP) becomes low. Meanwhile, when the content of a Ha element is too high, it is difficult to maintain the crystal structure having high conductivity, thereby decreasing the conductivity.

From such a viewpoint, the content of a Ha element is preferably 0.02% by mass or more and among them, 10% by mass or less and among them, more preferably 3% by mass or less.

Furthermore, for the above Compositional Formula (1), the content of S element is preferably 55 to 73% by mass. When the content of S element is 55 to 73% by mass, it is easy to take the crystal structure having high Li ion conductivity, which is favorable from the viewpoint of increasing the conductivity.

From such a viewpoint, the content of S element is preferably 55 to 73% by mass, and among them, 57% by mass or more and 72% by mass or less, and among them, further preferably 60% by mass or more and 71% by mass or less.

Furthermore, when the present solid electrolyte includes Li, Si, P, S, and Ha in the above ranges, it may also include other elements.

The present solid electrolyte preferably has the peak at the position of $2\theta=24.8°\pm0.5°$ to $26.1°\pm0.5°$ other than the peaks derived from the crystal structure of Li—Si—P—S type as described below for a XRD pattern, which is obtained by X-ray diffraction measurement using a CuKα line.

When the present solid electrolyte has such a XRD pattern, the conductivity after the solid electrolyte is immersed in a solvent can be maintained in a higher level. In detail, the conductivity (room temperature) after the solid electrolyte is immersed in N-methyl-2-pyrrolidone (NMP) can be $1\times10^{-4}$ S·cm$^{-1}$ or more.

The Li—Si—P—S type crystal structure is characterized in that it is a cubic crystal of a=b for a position coordinate in a crystal lattice and a $PS_4$ or $SiS_4$ tetrahedral center exists at the position of a=0, b=0, and c=0.5, the position of a=0, b=0.5, and c=0.69, and the position satisfying the following symmetry, and for the symmetry, the c-axis passing through a=0 and b=0.5 has the four-fold helical symmetry that is subjected to a translation by c=0.5, thereby being the plane 004 to be the glide plane of 110 direction, being the plane 220 to be the glide plane of 001 direction, and being the plane 200 to be the mirror plane.

The Li—Si—P—S type crystal structure is a crystal structure having the peaks that exhibit at the positions of at least $2\theta=20.2°\pm0.5°$, $24.0°\pm0.5°$, and $29.7°\pm0.5°$ for a XRD pattern which is obtained by X-ray diffraction measurement using a CuKα line.

Meanwhile, it can be expected that the peaks exhibited at the positions of 2θ=24.8°±0.5° to 26.1°±0.5° are derived from the phases that are different from the phase including a Ha element, that is, the Li—Si—P—S type crystal structure that is a basic structure.

For example, in the case of including I (iodine) as a Ha element, the peak is exhibited at the position of 2θ=24.8°±0.5°.

In addition, in the case of including Br (bromine) as a Ha element, the peak is exhibited at the position of 2θ=25.2°±0.5°.

In addition, in the case of including Cl (chlorine) as a Ha element, the peak is exhibited at the position of 2θ=25.6°±0.5°.

Furthermore, in the case of including F (fluorine) as a Ha element, the peak is exhibited at the position of 2θ=26.1°±0.5°.

(Method for Producing Present Solid Electrolyte)

Next, one example of the method for producing the present solid electrolyte will be described. However, the production method described here is merely an example.

The present solid electrolyte can be produced by the production method including mixing raw materials including lithium sulfide, phosphorus sulfide, silicon sulfide, and a halogen compound, grinding the mixture of the raw materials at a suitable strength, drying the grinded mixture if necessary, burning the product thus obtained at a temperature range of 500° C. to 650° C. under the atmosphere of sulfide gas, pulverizing or grinding the product thus obtained if necessary, and classifying the product thus obtained if necessary. However, the invention is not limited to the above production method.

For the grinding after mixing the raw materials, the grinding is performed at a high strength like a vibration mill or a mechanical milling to obtain a solid electrolyte having a crystal structure (stable structure) of low ionic conductivity, and thus, the initial conductivity thereof decreases. For this reason, the grinding is preferably performed with a ball mill, a beads mill, a homogenizer, and the like so as to have the metastable structure. At this time, at least, it is not required to decrease the crystallinity by grinding with a vibration mill or a mechanical milling.

The burning is preferably performed at a temperature range of 500° C. to 650° C., and among them, 600° C. or lower and among them, 575° C. or lower, under the hydrogen sulfide gas ($H_2S$) circulation.

The solid electrolyte having high crystallinity can be obtained when the burning is performed at a temperature of 500° C. or higher under the hydrogen sulfide gas ($H_2S$) circulation as described above. In addition, the solid electrolyte having low electronic conduction can be obtained when the burning is performed at a temperature of 650° C. or lower. Furthermore, when the burning is performed at a temperature of 575° C. or lower, the peak derived from the Li—Si—P—S type crystal structure (that is, the metastable structure) is obtained, which is particularly favorable.

Furthermore, the raw materials and burned product are very unstable in the atmosphere, thus, are decomposed by reacting with water, generate a hydrogen sulfide gas, or are oxidized. For this reason, it is preferable to perform a series of operations to set the raw materials in a furnace and to take out the burned product from the furnace through a glove box substituted with an inert gas atmosphere.

In addition, the non-reacted $H_2S$ gas is a poisonous gas. Therefore, preferably, an exhaust gas is completely combusted with a burner and the like, and then is neutralized with a sodium hydroxide solution and treated with sodium sulfite.

(Use of Present Solid Electrolyte)

The present solid electrolyte can be used for a solid electrolyte layer of an all-solid lithium secondary battery or an all-solid lithium primary battery, the solid electrolyte mixed in a positive or negative electrode material, or the like.

For example, an all-solid lithium secondary battery can be constituted by forming a positive electrode, a negative electrode, and a layer constituted of the solid electrolyte between the positive electrode and the negative electrode.

Here, the layer constituted of the solid electrolyte can be prepared, for example, by a method including dropping slurry composed of a solid electrolyte, a binder, and a solvent on a substrate, and rubbing and cutting with a doctor blade and the like; a method for cutting with an air knife after slurry contacting; and a screen printing method. Alternatively, the layer can be prepared in such a manner that powders of the solid electrolyte are pressed by a press and the like to prepare pressured powders, and then, the pressured powders are suitably processed.

As a positive electrode material, it is possible to properly use a positive electrode material that is used as the positive electrode active material of a lithium secondary battery.

As a negative electrode material, it is possible to properly use a negative electrode material that is used as the negative electrode active material of a lithium secondary battery.

Explanation of Terms

The term "solid electrolyte" in the invention means all the materials, in which an ion as a solid state, for example, $Li^+$ can be moved.

In addition, when "X to Y" (X and Y are arbitrary numbers) is described in the invention, unless otherwise particularly described, in addition to the meaning of "X or more and Y or less", the meanings of "preferably more than X" and "preferably less than Y" are also included.

In addition, when "X or more" (X is an arbitrary number) or "Y or less" (Y is an arbitrary number) is described, they includes the meanings of "one that is more than X is preferable" and "one that is less than Y is preferable."

EXAMPLES

Hereinafter, the invention will be described based on Examples. However, the invention is not limited to these Examples.

Example 1

In order to be Compositional Formulas listed in Table 1, mixed powder was prepared by weighing lithium sulfide ($Li_2S$), phosphorus sulfide ($P_2S_5$), silicon sulfide ($SiS_2$), and lithium bromide (LiBr) as halogenated lithium, respectively, mixing them, adding raw materials and a zirconium ball in 20 times mass of the total mass of the raw materials in an alumina container with a volume of 100 mL, and grinding the mixture for 12 hours with a desktop type ball mill "V-1M" manufactured from IRIE SHOKAI Co., Ltd. The mixed powder was filled in a container made of a carbon material. After the temperature of the container was increased at a temperature increase/decrease rate of 300° C./h in a tubular electric furnace while circulating the hydrogen sulfide gas ($H_2S$, 100% purity) at 1.0 L/min, the mixed powder was burned at 550° C. for 4 hours, and then, the temperature was dropped. Thereafter, the sample was ground with a mortar, and sieved through a sieve having an aperture diameter of 53 μm to obtain a sample in a powder state.

At this time, all of the weighing, mixing, setting into an electric furnace, taking out from the electric furnace, pulverizing, and sieving were performed in a glove box substituted with an Ar gas (Dew-point of −60° C. or lower) that was sufficiently dried.

As a result of analyzing the obtained sample as follows, it was confirmed that the sample was a crystalline solid electrolyte represented by Compositional Formula: $Li_xSi_yP_zS_aHa_w$ (here, Ha is Br, and $(x-y)/(y+z)=3.00$), in which the content of S was 6.2% by mass and the content of Br was 0.04% by mass.

Comparative Example 4

For Example 3, the burning was performed at 650° C. by flowing Ar instead of $H_2S$ to prepare a sample, and then, the sample was evaluated.

Comparative Example 5

For Example 3, the mixed powder was not burned, and was used and evaluated as a sample as it is.

Comparative Example 6

For Example 3, a sample was prepared and evaluated in the same method as in Example 3, except that the burning temperature was changed to be 700° C.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| $Li_2S$ | 2.148 | 2.068 | 2.147 | 1.657 | 2.119 | 2.24 | 1.95 | 2.127 | 2.127 | 2.147 |
| $P_2S_5$ | 1.835 | 2.135 | 1.527 | 1.85 | 1.309 | 0.903 | 2.434 | 1.826 | 1.826 | 1.527 |
| $SiS_2$ | 1.015 | 0.759 | 1.267 | 1.023 | 1.001 | 1.748 | 0.505 | 1.01 | 1.01 | 1.267 |
| Halogen | LiBr | LiI | LiCl | LiCl | LiF | LiBr | LiBr | LiI | LiI | LiCl |
|  | 0.002 | 0.037 | 0.058 | 0.47 | 0.07 | 0.109 | 0.111 | 0.037 | 0.037 | 0.058 |

|  | Example 11 | Example 12 | Example 13 | Comparative Example 1 | Comparative Example 2 | Comparative Example 3 | Comparative Example 4 | Comparative Example 5 | Comparative Example 6 |
|---|---|---|---|---|---|---|---|---|---|
| $Li_2S$ | 2.147 | 2.147 | 2.147 | 2.15 | 1.872 | 1.63 | 2.147 | 2.147 | 2.147 |
| $P_2S_5$ | 1.527 | 1.527 | 1.527 | 1.835 | 3.018 | 0.428 | 1.527 | 1.527 | 1.527 |
| $SiS_2$ | 1.267 | 1.267 | 1.267 | 1.015 | 0 | 2.815 | 1.267 | 1.267 | 1.267 |
| Halogen | LiCl | LiCl | LiCl | 0 | LiBr | LiBr | LiCl | LiCl | LiCl |
|  | 0.058 | 0.058 | 0.058 |  | 0.11 | 0.078 | 0.058 | 0.058 | 0.058 |

* The units of the numbers in the Table are "g".

In addition, as a result of performing the X-ray diffraction measurement of the obtained sample as follows, it was confirmed that there were the peaks at the positions of 2θ=20.2°, 24.0°, 25.2°, 27.0°, 29.1°, and 29.7°. Among them, the peak values in the respective ranges of 20.0°±0.5°, 24.0°±0.5°, 29.7°±0.5°, and 24.8°±0.5° to 26.1°±0.5° are only listed in Table 3 (Examples to be described below are the same).

Examples 2 to 9

Samples were prepared and evaluated in the same method as in Example 1, except that the compositions of raw materials were changed to be the same compositions as listed in Table 1.

Examples 10 to 13

For Example 3, the burning temperatures were changed to be 575° C. (Example 10), 525° C. (Example 11), 650° C. (Example 12), and 600° C. (Example 13), respectively, to prepare samples, and then, the samples were evaluated.

Comparative Examples 1 to 3

Samples were prepared and evaluated in the same method as in Example 1, except that the compositions of raw materials were changed to be the same compositions as listed in Table 1 for Example 1.

<Measurements of Produced Phase and Composition Ratio>

For the samples obtained from Examples and Comparative Examples, the produced phases were measured with an X-ray diffraction method. In addition, the respective composition ratios were measured by an ICP emission spectrometry.

FIG. 1 is an X-ray diffraction chart of the samples obtained from Examples 1 to 13 and Comparative Example 1.

The ICP analysis for Example Li, Si, P, Ha, and S was performed, and then, the values of $(x-y)/(y+z)$ are listed after converting these analyzed values (% by mass) into a molar number.

TABLE 2

|  |  | Analyzed value (wt %) | | | | | Converted value from analyzed value |
|---|---|---|---|---|---|---|---|
|  | Ha | Si | Ha | S | Li | P | $(x - y)/(y + z)$ |
| Example 1 | Br | 6.2 | 0.04 | 65.1 | 13.0 | 10.2 | 3.00 |
| Example 2 | I | 4.6 | 0.74 | 67.2 | 12.5 | 11.9 | 2.99 |
| Example 3 | Cl | 7.9 | 0.95 | 65.5 | 13.3 | 8.5 | 2.94 |
| Example 4 | Cl | 6.2 | 7.90 | 60.8 | 11.6 | 10.3 | 2.62 |
| Example 5 | F | 6.1 | 0.91 | 66.7 | 13.2 | 10.2 | 3.08 |
| Example 6 | Br | 10.1 | 2.10 | 65.2 | 13.3 | 5.2 | 2.95 |
| Example 7 | Br | 3.7 | 2.20 | 67.0 | 12.3 | 13.1 | 2.96 |
| Example 8 | I | 6.1 | 0.69 | 68.3 | 12.9 | 10.2 | 3.00 |
| Example 9 | I | 6.1 | 0.69 | 68.3 | 12.9 | 10.2 | 3.00 |
| Example 10 | Cl | 7.9 | 0.95 | 65.7 | 13.3 | 8.5 | 2.94 |

TABLE 2-continued

| | | Analyzed value (wt %) | | | | | Converted value from analyzed value |
|---|---|---|---|---|---|---|---|
| | Ha | Si | Ha | S | Li | P | (x − y)/(y + z) |
| Example 11 | Cl | 8 | 0.96 | 65.8 | 13.3 | 8.6 | 2.90 |
| Example 12 | Cl | 7.9 | 0.92 | 64 | 13.5 | 8.5 | 2.98 |
| Example 13 | Cl | 8.1 | 0.95 | 64.9 | 13.3 | 8.5 | 2.89 |
| Comparative Example 1 | None | 6.1 | 0 | 67.5 | 12.9 | 10.3 | 2.99 |
| Comparative Example 2 | Br | 0 | 2.00 | 66.2 | 11.4 | 16.8 | 3.03 |
| Comparative Example 3 | Br | 12.0 | 2.00 | 66.0 | 14.1 | 3.3 | 3.01 |
| Comparative Example 4 | Cl | 7.9 | 0.95 | 59.2 | 13.3 | 8.5 | 2.94 |
| Comparative Example 5 | Cl | 7.6 | 0.96 | 69 | 13.1 | 8.4 | 2.98 |
| Comparative Example 6 | Cl | 7.9 | 0.95 | 61.2 | 13.4 | 8.2 | 3.02 |

<Measurement of Conductivity>

For the samples obtained from Examples and Comparative Examples, the conductivities (initial) thereof were first measured as the following manner.

Next, the samples were immersed in 10 times amount (mass) of N-methyl-2-pyrrolidone (NMP) solvent (temperature of 25° C.) or other solvents; the NMP or other solvents were dried with a hot plate at 300° C.; and then, the ionic conductivities (unit of S·cm$^{-1}$) were measured as follows.

At this time, pellets were prepared by performing uniaxial pressing molding in a glove box; then, the pellets were subjected to a CIP molding at 200 MPa; also, a carbon paste as an electrode was applied on both sides of the top and bottom of the pellet; and then, heat-treatment was performed at 180° C. for 30 minutes to prepare samples for measuring an ionic conductivity. In addition, the ionic conductivity was measured by an alternating current impedance method at room temperature (25° C.).

The alternating current impedance method was a method for measuring a resistance component as an impedance component while changing the frequency of an AC voltage. The respective resistance components can be separated by the frequency dependences of the respective resistance components for the measuring samples, that is, the difference in relaxation time.

The solid electrolyte exhibits electric conductivity by a lithium ion conduction. However, for the relaxation time, it is known that the order of bulk resistance<grain boundary resistance<electrode interface resistance becomes smaller by experience, and thus, the impedance to the frequency was plotted (refers to as a Cole-Cole plot), thereby obtaining the sizes for the respective resistance components. Here, in the present Example, one obtained by combining the bulk resistance component and the grain boundary resistance component was calculated as an ionic conductivity.

In addition, for calculating the impedance, when the impedance was plotted by a marking method, that is, a Cole-Cole plot, in the case of a typical solid electrolyte, there was exactly exhibited minimum one point where the plot approached near horizontal axis (phase difference=0°). Therefore, this point was read (estimated) as the impedance of the ionic conduction, and then, converted into an ionic conductivity.

At this time, for a Cole-Cole plot, when the point where the plot approached near horizontal axis (phase difference=0°) was not exactly exhibited, the reading could not be performed. The solid electrolyte was not an electron, but a solid that allows ions such as Li$^+$ to pass through. However, when the measuring sample had electric conductivity, the reading could not be performed as described above. "Unreadable" in Table represents the result in that the measuring sample had electric conductivity, and could not be read as described above. Meanwhile, "Immeasurable" in Table represents that since the measured signal was smaller than noise, there were no exactly values, and a specific number was less than 1×10$^{-6}$ S·cm$^{-1}$.

TABLE 3

| | | Peak value (2θ) | | | | Measurement of conductivity after solid electrolyte is immersed in solvent | |
|---|---|---|---|---|---|---|---|
| | Analyzed value (x − y)/(y + z) | 20.2° ± 0.5° | 24.0° ± 0.5° | 29.7° ± 0.5° | 24.8° ± 0.5° to 26.1° ± 0.5° | Immersing solvent | Li ion conductivity after solid electrolyte is immersed in solvent |
| Example 1 | 3.00 | 20.2° | 24.0° | 29.7° | 25.2° | NMP | 1.43 × 10$^{-4}$ S · cm$^{-1}$ |
| Example 2 | 2.99 | 20.2° | 24.0° | 29.7° | 24.8° | NMP | 1.19 × 10$^{-4}$ S · cm$^{-1}$ |
| Example 3 | 2.94 | 20.2° | 24.0° | 29.7° | 25.6° | NMP | 2.67 × 10$^{-4}$ S · cm$^{-1}$ |
| Example 4 | 2.62 | 20.2° | 24.0° | 29.7° | 25.6° | NMP | 1.42 × 10$^{-4}$ S · cm$^{-1}$ |
| Example 5 | 3.08 | 20.2° | 24.0° | 29.7° | 26.1° | NMP | 1.68 × 10$^{-4}$ S · cm$^{-1}$ |
| Example 6 | 2.95 | None | None | None | None | NMP | 1.35 × 10$^{-8}$ S · cm$^{-1}$ |
| Example 7 | 2.96 | None | None | None | None | NMP | 1.09 × 10$^{-8}$ S · cm$^{-1}$ |
| Example 8 | 3.00 | 20.2° | 24.0° | 29.7° | 24.7° | Acetone | 3.68 × 10$^{-4}$ S · cm$^{-1}$ |
| Example 9 | 3.00 | 20.2° | 24.0° | 29.7° | 24.7° | DMF | 1.58 × 10$^{-4}$ S · cm$^{-1}$ |
| Example 10 | 2.94 | 20.2° | 24.0° | 29.7° | 25.6° | NMP | 1.58 × 10$^{-4}$ S · cm$^{-1}$ |
| Example 11 | 2.90 | 20.2° | 24.0° | 29.7° | 25.6° | NMP | 1.05 × 10$^{-4}$ S · cm$^{-1}$ |
| Example 12 | 2.98 | None | None | None | None | NMP | 1.58 × 10$^{-4}$ S · cm$^{-1}$ |
| Example 13 | 2.89 | None | None | None | None | NMP | 1.05 × 10$^{-4}$ S · cm$^{-1}$ |
| Comparative Example 1 | 2.99 | None | None | None | None | NMP | Immeasurable |
| Comparative Example 2 | 3.03 | None | None | None | None | NMP | 4.68 × 10$^{-5}$ S · cm$^{-1}$ |
| Comparative Example 3 | 3.01 | None | None | None | None | NMP | 2.15 × 10$^{-5}$ S · cm$^{-1}$ |
| Comparative Example 4 | 2.94 | None | None | None | None | NMP | Unreadable |
| Comparative Example 5 | 2.98 | None | None | None | None | NMP | Immeasurable |
| Comparative Example 6 | 3.02 | None | None | None | None | NMP | Unreadable |

By combining the results of Examples and test results performed by the inventors until now, it was found that, for a crystalline solid electrolyte represented by Compositional Formula: Li$_x$Si$_y$P$_z$S$_a$Ha$_w$ (here, Ha includes one or two or more of Br, Cl, I, and F, and 2.4<(x−y)/(y+z)<3.3), when the content of S was 55 to 73% by mass, the content of Si was 2 to 11% by mass, and the content of a Ha element was 0.02% by mass or more, for example, the crystalline solid electrolyte can be used as a dispersion medium when slurrying a polar solvent such as N-methyl-2-pyrrolidone (NMP), acetone, or N,N-dimethylformamide (DMF), and also, it is possible to suppress a decrease in conductivity when the crystalline solid electrolyte is immersed in these solvents.

In addition, the crystal structures of the samples obtained from Examples 1 to 13 and Comparative Examples 1 to 6 were analyzed based on the XRD patterns of the samples obtained from the respective Examples and Comparative Examples. As the analyzing results, it was found that the crystal structures of the samples obtained from Examples 1 to 5 and Examples 8 to 11 were the crystal structure, in which for a cubic crystal of a=b, a $PS_4$ or $SiS_4$ tetrahedron existed at the position of a=0, b=0, and c=0.5, the position of a=0, b=0.5, and c=0.69, and the position satisfying the following symmetry, and for the symmetry, the c-axis passing through a=0 and b=0.5 had the four-fold helical symmetry that was subjected to a translation by c=0.5, thereby being the plane 004 to be the glide plane of 110 direction, being the plane 220 to be the glide plane of 001 direction, and being the plane 200 to be the mirror plane (also refers to as "a novel Li—Si—P—S crystal structure"). These results were not obtained in Li—Si—P—S system in times past.

Further, in addition to the XRD pattern that was simulated as the above structure, there were observed the peaks changed by a halogen class, which were included in the position of $2\theta=24.8°\pm0.5°$ to $26.1°\pm0.5°$.

In addition, it was found that, when having such a novel Li—Si—P—S crystal structure, the conductivity after the solid electrolyte is immersed in a solvent can be maintained in a higher level. In detail, it was found that the conductivity (room temperature) after the solid electrolyte is immersed in N-methyl-2-pyrrolidone (NMP) can be $1\times10^{-4}$ S·cm$^{-1}$ or more.

The invention claimed is:

1. A crystalline solid electrolyte being represented by Compositional Formula: $Li_xSi_yP_zS_aHa_w$ (here, Ha includes one or two or more of Br, Cl, I, and F, and $2.4<(x-y)/(y+z)<3.3$), wherein the content of S is 55 to 73% by mass, the content of Si is 2 to 11% by mass, and the content of a Ha element is 0.02% by mass or more, the crystalline solid electrolyte has peaks exhibited at positions of $2\theta=20.2°\pm0.5°$, $24.0°\pm0.5°$, and $29.7°\pm0.5°$ and peaks exhibited at positions of $2\theta=24.8°\pm0.5°$ to $26.1°\pm0.5°$, for a XRD pattern obtained by X-ray diffraction measurement using a CuKα line, and the peaks exhibited at the positions of $2\theta=20.2°\pm0.5°$, $24.0°\pm0.5°$, and $29.7°\pm0.5°$ are derived from a Li—Si—P—S type crystal structure, and the Li—Si—P—S type crystal structure is a crystal structure, in which the crystal is a cubic crystal of a=b for a position coordinate in a crystal lattice, a $PS_4$ or $SiS_4$ tetrahedral center exists at the position of a=0, b=0, and c=0.5, the position of a=0, b=0.5, and c=0.69, and the position satisfying the following symmetry, and for the symmetry, the c-axis passing through a=0 and b=0.5 has the four-fold helical symmetry that is subjected to a translation by c=0.5, thereby being the plane 004 to be the glide plane of 110 direction, being the plane 220 to be the glide plane of 001 direction, and being the plane 200 to be the mirror plane.

2. A lithium secondary battery having the constitution constituted by using the crystalline solid electrolyte according to claim 1.

3. A method for producing the crystalline solid electrolyte according to claim 1, the method comprising mixing raw materials including lithium sulfide, phosphorus sulfide, silicon sulfide, and a halogen compound, and burning the mixture thus obtained at 500 to 650° C. under the atmosphere of sulfide gas.

4. The method for producing a crystalline solid electrolyte according to claim 3, wherein the halogen is one or two or more of Br, Cl, I, and F.

5. A lithium secondary battery having the constitution constituted by using the crystalline solid electrolyte according to claim 1.

* * * * *